United States Patent [19]

van der Schoot

[11] Patent Number: 4,632,025

[45] Date of Patent: Dec. 30, 1986

[54] STEAM PEELING APPARATUS

[75] Inventor: Peter W. C. van der Schoot, Groot-Ammers, Netherlands

[73] Assignee: Goudsche Machinefabriek B.V., CA Gouda, Netherlands

[21] Appl. No.: 795,389

[22] Filed: Nov. 6, 1985

[30] Foreign Application Priority Data

Nov. 13, 1984 [NL] Netherlands ........................ 8403463

[51] Int. Cl.[4] ................................................ A23N 7/00

[52] U.S. Cl. ........................................ 99/348; 99/467; 99/479; 99/483; 99/516; 99/584

[58] Field of Search ................. 99/348, 410, 356, 359, 99/583, 584, 467–471, 516, 539, 540, 644, 629–634; 426/482; 366/105, 220, 292, 293, 314, 102, 103

[56] References Cited

U.S. PATENT DOCUMENTS

| | | | |
|---|---|---|---|
| 4,222,322 | 9/1980 | van der Schoot | 99/467 |
| 4,393,756 | 7/1983 | van der Schoot | 99/348 |

*Primary Examiner*—Timothy F. Simone

*Attorney, Agent, or Firm*—Sprung Horn Kramer & Woods

[57] ABSTRACT

A steam peeling or cooking apparatus for produce, such as potatoes, carrots, celeriac, red beets, Swedish turnips, apples, and the like, comprising a substantially cylindrical peeling vessel basically stationary in operation, said vessel including supply and discharge conduits for medium, in particular steam, and having closable supply and discharge openings. Said vessel is divided into two compartments by a grid-like screen arranged substantially at right angles to the axis of the peeling vessel. The compartment not being in direct contact with the produce supply opening forms a condensate chamber and includes a closable discharge opening, said apparatus further including means for agitating the produce during operation. According to the invention the grid-like screen is fixedly secured to the vessel and has a passage which, in operation, is closed by a grid-like valve movable perpendicularly to the plane of the grid and the condensate chamber is fitted with a closable discharge opening for produce and/or condensate.

4 Claims, 1 Drawing Figure

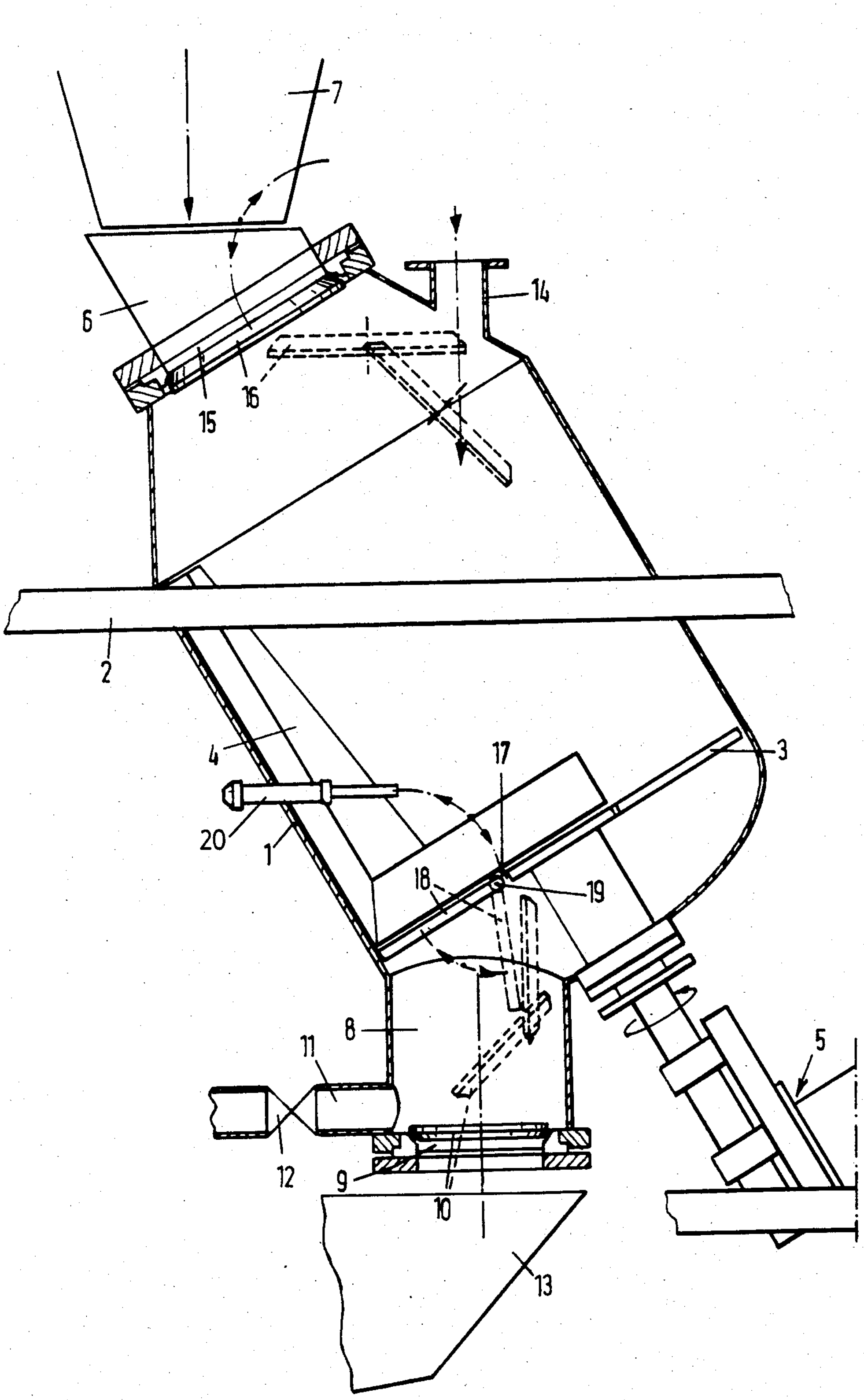
7
14
6
15
16
2
4
17
3
20
1
18
19
8
11
5
12
9
10
13

STEAM PEELING APPARATUS

BACKGROUND OF THE INVENTION

This invention relates to a steam peeling or cooking apparatus for produce, such as potatoes, carrots, celeriac, red beets, Swedish turnips, apples, and the like, comprising a substantially cylindrical peeling vessel basically stationary in operation, said vessel including supply and discharge conduits for medium, in particular steam, and having closable supply and discharge openings, and being divided into two compartments by a grid-like screen arranged substantially at right angles to the axis of the peeling vessel, the compartment not being in direct contact with the produce supply opening forming a condensate chamber and including a closable discharge opening, said apparatus further including means for agitating the produce during operation.

In similar apparatus described in Dutch patent applications Nos. 76,11025 and 78,112678, the produce is loaded and unloaded by way of a closable top opening. Steam is supplied and discharged by means of trunnions by which the peeling vessel is suspended in a tiltable manner.

In such an apparatus, the total cycle time is determined on the one hand by the actual steaming time of the produce (this is a produce-dependent time) and on the other hand by a produce-independent time (sometimes referred to as the dead time), being the time needed for filling, emptying, valve movement, steam blow-off, tilting and the like.

The produce-dependent time is a fixed datum, so when a shorter cycle time is desired, it should be tried to shorten the produce-independent time: it should be borne in mind that the total cycle time is as short as about 60 seconds and consists as to at most half of produce-dependent time.

Major drawbacks of the prior art apparatus are: the tilting required for filling and emptying the peeling vessel necessitates a drive mechanism with bearing etc. Since a peeling vessel of several tons is concerned here, a heavy drive mechanism with fittings is necessary, by means of which fittings steam can be supplied and discharged. In order to avoid unduly expensive bearings, rotary stuffing box etc., the diameter of the steam supply and discharge line traversing the bearings should be limited. This implies that steam blow-off cannot take place in an optimal i.e. explosive manner. Yet this is desirable in order to ensure that the peel is released and blown off already during steam blow-off. Moreover, explosive or rapid steam blow-off will also ensure that the temperature in the vessel falls rapidly, which reduces the permeation of heat into the product and results in a minimum thickness of the so-called cook ring. By cook ring is understood that portion of fruit or vegetable which has been in contact with steam. This softer portion will be partly removed with the peel and if too thick will result in undue product losses and waste water contamination. The longer the produce is in contact with steam, the greater will be the depth of steam penetration and hence the cook ring thickness. It will be clear, therefore, that after the actual steaming time required for peel removal, the steam is to be discharged as quickly as possible in order to minimize the cook ring thickness.

SUMMARY OF THE INVENTION

It is an object of the present invention to provide a peeling vessel of improved efficiency and increased capacity and yet to realize a major reduction in cost price.

To this end according to the invention, a peeling vessel of the above described type is characterized in that the grid-like screen is fixedly secured to the vessel and has a passage which, in operation, is closed by a grid-like valve movable perpendicularly to the plane of the grid, and the condensate chamber is fitted with a closable discharge opening for produce and/or condensate.

The condensate may be removable by way of a separate condensate discharge pipe connected to the condensate chamber. This arrangement renders the tilting of the peeling vessel and hence the bearing and drive mechanism superfluous. Besides, the steam can be supplied and discharged directly by means of a valved stub tube.

It is observed that Applicants' Dutch patent application No. 76,11024 discloses a peeling vessel comprising a grid having a passage covered by a disc rotatable relative to said grid. True, here too, the peeling vessel need not be tilted for releasing the product or the condensate, but the peeling vessel has to be rotated about its longitudinal axis for a short time for ensuring that the product is steamed on all sides. As a result, the time gained on the one hand is lost by the necessity of rotation of the vesel in operation. The latter, moreover, increases the cost price and extends the blow-off time.

In a further embodiment of the present invention, said discharge opening may be fitted with a discharge stub having a closable produce passage as well as a closable condensate discharge opening.

Furthermore, when use is made of a stationary vessel containing at least one agitated member, e.g. a stirring arm, the discharge stub disposed in the lowest point of the condensate chamber may be fitted with a closable produce discharge opening at its lower end and with the closable condensate discharge opening at a lateral location.

BRIEF DESCRIPTION OF THE DRAWING

One embodiment of the peeling vessel according to the present invention will now be described, by way of example, with reference to the accompanying drawing, showing a diagrammatical cross-section.

DETAILED DESCRIPTION OF THE INVENTION

According to the drawing, a stationary peeling vessel 1 mounted on a support 2 includes a grid 3 dividing said vessel into two compartments, i.e. a lower condensate compartment and an upper produce treating compartment. The upper produce treating compartment contains a stirring arm 4 driven by a drive mechanism 5 shown diagrammatically. A similar construction is described in Applicants' prior patent application No. 78,12678, corresponding to U.S. Pat. Nos. 4,393,756 and 4,478,863, so that with regard to further details reference is made to these publications.

The top of the peeling vessel includes a funnel 6, likewise described in the above publications. The drawing shows above funnel 6 a funnel-shaped outlet 7 of a hopper, not shown, for the produce to be steamed.

The lower end of the peeling vessel, contiguous with the condensate chamber, includes a discharge stub 8 having at its lower end a produce outlet 9 closable by a valve 10: the construction shown is described in detail in the aforementioned publications.

The discharge stub 9, just above the produce outlet 9, links up laterally with a condensate outlet 11 having a shut-off device 12, e.g. of the type as described in Applicants' Dutch patent application No. 84.00650.

Disposed under discharge stub 8, is a discharge funnel 13, shown diagrammatically, wherein the steamed produce can be collected and possibly delivered for further treatment to e.g. a brush conveyor, as described e.g. in Applicants' U.S. Pat. No. 4,242,952.

The peeling vessel further includes a steam supply and discharge stub 14, which will not be further described, as such valved steam supply and discharge stubs or lines are well known and are described e.g. in the aforementioned publications of Applicants.

As also shown in the drawing, the produce supply opening 15 of peeling vessel 1 includes a shut-off valve 16 operated in such a manner that it can perform the movement in the peeling vessel indicated by dashed lines: as a result, a maximum degree of filling is obtained. This is described in Applicants' Dutch patent application No. 83,03867, counterparts of which have been filed in the USA and Canada.

The above valve 10 is similarly adapted to perform corresponding movements: these too, are shown in the drawing by dashed lines.

Grid 3, at its lowest portion, includes a passage or outlet 17 wherein there is provided a likewise grid-shaped valve 18 pivoting about a shaft 19. Shaft 19 is outwardly extended on one side of the peeling vessel and is driven by a diagrammatically shown piston-and-cylinder assembly 20.

The operation of the apparatus will be clear after the above description. After the filling of the peeling vessel 1 from the outlet 7, the valve 16 is closed. Subsequently, steam is supplied into the vessel through stub tube 14, in which vessel the produce is kept in motion by means of the stirring arm 4. After a pre-determined steaming time, the steam is discharged again through the steam supply and discharge stub 14.

The condensate being collected during the steaming operation underneath grid 3 is removed during and/or after the steaming operation through the condensate outlet 11. After the condensate has been removed, first the produce outlet valve 10 and then the grid-shaped valve 18 are opened, allowing the steamed produce to fall into funnel 13 and to be discharged further.

After all produce has been removed, the grid-shaped valve 18 and valve 10 are closed, and valve 16 is opened for supplying a fresh batch.

The construction above described has the advantage that a steam inlet and outlet of large diameter can be used, so that a rapid supply and discharge of steam can be effected.

As the peeling vessel no longer needs to be tilted now, all times required therefor become superfluous, so that the cycle time can be shortened substantially. Moreover, the apparatus can have a substantially simpler, and hence less expensive, design owing to the absence of all elements required for tilting and, as a result, is more reliable in operation. Naturally, there is the necessity on the other hand of fitting the apparatus with additional produce discharge means with valved outlet and valve, as well as means for the operation of the latter. However, these are substantially cheaper than the abovementioned means.

It will be clear that a great many modifications are possible within the scope of the present invention.

What I claim is:

1. A steam peeling or cooking apparatus for produce or pulp, comprising:

a substantially cylindrical peeling vessel having a longitudinal axis and stationary during use with the longitudinal axis tilted, with respect to the vertical;

a grid fixedly disposed in the vessel and wherein the grid divides the vessel into a produce chamber and a condensate chamber, at least one stirring arm disposed on one side of the grid facing the produce chamber and rotatable about the longitudinal axis, a closable supply opening in the produce chamber receptive of product, a steam supply and discharge opening in the produce chamber, means forming a closable produce discharge opening in the grid in the lowest point thereof and including a valve movable downwardly into the condensate chamber about an axis parallel to the plane of the grid, means forming a closable discharge opening in the condensate chamber of the vessel vertically aligned with the produce discharge opening in the grid, whereby condensate and produce are discharged from the vessel without the need for tilting or rotating the vessel.

2. The steam peeling apparatus according to claim 1, wherein the condensate chamber includes a separate condensate discharge opening.

3. The steam peeling apparatus according to claim 1, wherein said discharge opening includes a discharge stub having a closable produce passage and a closable condensate outlet.

4. The apparatus according to claim 3, wherein the discharge stub is disposed in the lowest point of the condensate chamber with the closable produce discharge outlet at its lower end and the closable condensate discharge outlet at a lateral location.

* * * * *